US007967871B2

(12) United States Patent
Gibbs et al.

(10) Patent No.: US 7,967,871 B2

(45) Date of Patent: Jun. 28, 2011

(54) POLYMERS FOR LAUNDRY APPLICATIONS

(75) Inventors: Christopher David Gibbs, Bebington (GB); Alyn James Parry, Bebington (GB); Susanne Henning Rogers, Bebington (GB)

(73) Assignee: The Sun Products Corporation, Wilton, CT (US)

( * ) Notice: Subject to any disclaimer, the term of this patent is extended or adjusted under 35 U.S.C. 154(b) by 435 days.

(21) Appl. No.: 11/919,526

(22) PCT Filed: Apr. 12, 2006

(86) PCT No.: PCT/EP2006/003549

§ 371 (c)(1), (2), (4) Date: Oct. 29, 2007

(87) PCT Pub. No.: WO2006/117071

PCT Pub. Date: Nov. 9, 2006

(65) Prior Publication Data

US 2009/0318324 A1 Dec. 24, 2009

(30) Foreign Application Priority Data

Apr. 29, 2005 (GB) .................................. 0508883.6

(51) Int. Cl.

| | |
|---|---|
| ***B08B 3/04*** | (2006.01) |
| ***C11D 3/22*** | (2006.01) |
| ***C11D 3/37*** | (2006.01) |
| ***C08F 251/00*** | (2006.01) |

(52) U.S. Cl. ............ 8/137; 510/470; 510/472; 424/488; 424/70.13

(58) Field of Classification Search .................. 510/470, 510/472; 424/488, 70.13; 8/137

See application file for complete search history.

(56) References Cited

U.S. PATENT DOCUMENTS

| | | | | |
|---|---|---|---|---|
| 2,847,385 | A | 8/1958 | Hiler | 252/152 |
| 3,756,966 | A | 9/1973 | Lamberti | 252/557 |
| 4,000,127 | A | 12/1976 | Cornelissens et al. | 536/102 |
| 4,235,735 | A | 11/1980 | Marco et al. | 252/174.18 |
| 4,379,061 | A | 4/1983 | Rabitsch et al. | 252/174.18 |
| 2004/0107505 | A1 | 6/2004 | Harrison et al. | |
| 2005/0107505 | A1 | 5/2005 | Shinoda et al. | 524/321 |

FOREIGN PATENT DOCUMENTS

| | | | |
|---|---|---|---|
| DE | 197 44 745 | | 4/1999 |
| EP | 0 072 971 | | 2/1985 |
| EP | 0 146 395 | | 6/1985 |
| EP | 0 897 929 | | 2/1999 |
| FR | 2 707 649 | | 1/1995 |
| GB | 846217 | | 11/1958 |
| WO | 00/18861 | | 4/2000 |
| WO | 00/18862 | | 4/2000 |
| WO | 03/040279 | | 5/2003 |
| WO | WO 03/040279 | * | 5/2003 |

OTHER PUBLICATIONS

PCT International Search Report in a PCT application PCT/EP2006/003549, Jul. 12, 2006.

GB Search Report in a GB application GB0508883.6, Aug. 26, 2005.

Derwent Abstract of FR 2 707 649 published Jan. 20, 1995.

Derwent Abstract of EP 072 971 published march 2, 1983.

Derwent Abstract of DE 197 44 745 published Apr. 15, 1999.

* cited by examiner

*Primary Examiner* — Brian P Mruk

(74) *Attorney, Agent, or Firm* — Sterne, Kessler, Goldstein & Fox P.L.L.C.

(57) ABSTRACT

The present invention relates to use of a compound for promoting antiredeposition during laundering of a textile fabric, in which the compound is a polymer comprising a polysaccharide backbone substituted by one or more groups $-L-R^1$, where L represents an ester, amide or ether linkage and R represents an anionic alkyl group or a salt thereof, which has a degree of substitution of from 0.005 to 1 and a degree of biodegradation of at least 60% in 28 days. The use of such polymers in the manufacture of a laundry cleaning composition is also provided as well as laundry cleaning compositions containing such polymers.

14 Claims, No Drawings

POLYMERS FOR LAUNDRY APPLICATIONS

TECHNICAL FIELD

The present invention relates to the use of certain biodegradable anionic alkyl derivatives of polysaccharides for promoting antiredeposition during laundering of a textile fabric, the use of such polysaccharides in the manufacture of a laundry cleaning composition and laundry cleaning compositions containing such polysaccharides.

BACKGROUND OF THE INVENTION

The washing of soiled fabrics with a laundry detergent composition is essentially a two step process. In the first stage the detergent must remove the soil particles from the fabric and suspend them in the soil solution. In the second stage the detergent composition must prevent the soil particles and other insolubles from redepositing on the cloth before and after the fabric is removed from the soil solution or the rinse solution. Polymers are known to aid both processes, soil release polymers enhance soil removal from the fabric whilst anti-redeposition polymers prevent the deterged soil from depositing on the fabric.

Laundry detergent compositions traditionally contain among other chemicals sodium carboxy methyl cellulose (SCMC) as an antiredeposition agent. U.S. Pat. No. 4,235,735 (Macro et al Miliken) discloses cellulose acetates with a defined degree of substitution as antiredeposition agents in laundry detergent compositions.

Other cellulosic materials have also been used in laundry detergent compositions for a variety of benefits, for example soil release and fabric care benefits.

WO 00/18861A (Unilever) and WO 00/18862A (Unilever) disclose cellulosic compounds having a benefit agent attached so that the benefit agent will be deposited on the fibres of the washed textiles during the laundry process.

In order to establish effective antiredeposition properties a high degree of substitution is required in order to make these molecules soluble, for example SCMC with a degree of substitution of 0.2 does not dissolve in water. It is known in the art that SCMC with a degree of substitution of about 0.5 and above dissolves, and it functions as an antiredeposition agent. However, because of the higher degree of substitution it is not readily biodegradable.

It has now been found that use of anionic alkyl derivatives of polysaccharides with a low degree of substitution, namely of from 0.005 to 1, provides for a readily biodegradable polymer. In addition, as such polymers are also soluble, they have been found to provide for the promotion of antiredeposition during the laundering of a textile fabric. Yet the low degree of substitution means that this antiredeposition is achieved with the added advantage of the compound itself being more biodegradable than functional equivalents.

DEFINITION OF THE INVENTION

A first aspect of the present invention provides use of a compound for promoting antiredeposition during laundering of a textile fabric, in which the compound is a polymer comprising a polysaccharide backbone substituted by one or more groups $-L-R^1$, where L represents an ester, amide or ether linkage and $R^1$ represents an anionic alkyl group or a salt thereof, which has a degree of substitution of from 0.005 to 1 and a degree of biodegradation of at least 60% in 28 days.

A second aspect of the invention provides use of a compound in the manufacture of a laundry cleaning composition for promoting antiredeposition during laundering of a textile fabric, in which the compound is a polymer as defined above.

In a third aspect, the invention provides a laundry cleaning composition which comprises from 0.01 to 50% by weight based on the total weight of the composition of a polymer as defined above.

DETAILED DESCRIPTION OF THE INVENTION

In the context of this specification, the terms “cleaning” or “laundering” mean “washing and/or rinsing”.

DEFINITIONS

The following definitions pertain to chemical structures, molecular segments and substituents:

The term “alkyl” as used herein refers to a branched or unbranched saturated hydrocarbon group which may contain from 1 to 12 carbon atoms, such as methyl, ethyl, n-propyl, isopropyl, n-butyl, isobutyl, t-butyl, octyl, decyl etc. More preferably, an alkyl group contains from 1 to 6, preferably 1 to 4 carbon atoms. Ethyl and propyl groups are especially preferred. “Substituted alkyl” refers to alkyl substituted with one or more substituent groups. Preferably, alkyl and substituted alkyl groups are unbranched. An “alkenyl” group is a branched or unbranched unsaturated hydrocarbon containing 1 to 12, preferably 1 to 6 and especially 1 to 4 carbon atoms. Preferably, alkenyl and substituted alkenyl groups are unbranched.

A halogen atom may be a fluorine, chlorine, bromine or iodine atom and any group which contains a halo moiety, such as a haloalkyl group, may thus contain any one or more of these halogen atoms.

As those of skill in the art of polysaccharide polymers recognise, the term “degree of substitution” (or DS) refers to substitution of the functional groups on the repeating sugar unit. In the case of polysaccharide polymers, DS refers to substitution of the three hydroxyl groups on the repeating sugar unit. Thus, the maximum degree of substitution is 3. DS values do not generally relate to the uniformity of substitution of chemical groups along the polysaccharide molecule and are not related to the molecular weight of the polysaccharide backbone. For example, the degree of substitution (DS) can be determined using NMR spectroscopy after acid degradation of the polysaccharide backbone.

The Polysaccharide Before Substitution

As used herein, the term “polysaccharides” includes natural polysaccharides, synthetic polysaccharides, polysaccharide derivatives and modified polysaccharides. However, unmodified polysaccharides are preferred. Suitable polysaccharides for use in preparing the compounds of the present invention include, but are not limited to, gums, arabinans, galactans, seeds and mixtures thereof.

Suitable polysaccharides that are useful in the present invention include polysaccharides with a degree of polymerisation (DP) over 10, preferably from about 10 to about 100,000, more preferably from about 500 to about 50,000. Constituent saccharides preferably include, but are not limited to, one or more of the following saccharides: isomaltose, isomaltotriose, isomaltotetraose, isomaltooligosaccharide, fructooligosaccharide, levooligosaccharides, galactooligosaccharide, xylooligosaccharide, gentiooligosaccharides, disaccharides, glucose, fructose, galactose, xylose, mannose, sorbose, arabinose, rhamnose, fucose, maltose, sucrose, lactose, maltulose, ribose, lyxose, allose, altrose, gulose, idose, talose, trehalose, nigerose, kojibiose, lactulose, oligosaccharides, maltooligosaccharides, trisaccharides, tetrasaccharides, pentasaccharides, hexasaccharides, oligosaccharides from partial hydrolysates of natural polysaccharide sources and mixtures thereof.

The polysaccharides can be extracted from plants, produced by organisms, such as bacteria, fungi, prokaryotes, eukaryotes, extracted from animal and/or humans. For example, xanthan gum can be produced by *Xanthomonas campestris*, gellan by *Sphingomonas paucimobilis*, xyloglucan can be extracted from tamarind seed.

The polysaccharides can be linear, or branched in a variety of ways, such as 1-2, 1-3, 1-4, 1-6, 2-3 and mixtures thereof. Many naturally occurring polysaccharides have at least some degree of branching, or at any rate, at least some saccharide rings are in the form of pendant side groups on a main polysaccharide backbone.

It is desirable that the polysaccharides of the present invention have a molecular weight in the range of from about 5,000 to about 10,000,000, more preferably from about 50,000 to about 1,000,000, most preferably from about 50,000 to about 500,000.

Preferably, the polysaccharide is selected from the group consisting of: tamarind gum (preferably consisting of xyloglucan polymers), guar gum, locust bean gum (preferably consisting of galactomannan polymers), and other industrial gums and polymers, which include, but are not limited to, Tara, Fenugreek, Aloe, Chia, Flaxseed, Psyllium seed, quince seed, xanthan, gellan, welan, rhamsan, dextran, curdlan, pullulan, scleroglucan, schizophyllan, chitin, arabinan (preferably from sugar beets), de-branched arabinan (preferably from sugar beets), arabinoxylan (preferably from rye and wheat flour), galactan (preferably from lupin and potatoes), pectic galactan (preferably from potatoes), galactomannan (preferably from carob, and including both low and high viscosities), glucomannan, lichenan (preferably from icelandic moss), mannan (preferably from ivory nuts), pachyman, rhamnogalacturonan, acacia gum, agar, alginates, carrageenan, chitosan, clavan, hyaluronic acid, heparin, inulin, and mixtures thereof. These polysaccharides can also be treated (preferably enzymatically) so that the best fractions of the polysaccharides are isolated.

Polysaccharides can be used which have an α- or β-linked backbone. However, more preferred polysaccharides have a β-linked backbone, preferably a β-1,4 linked backbone. It is preferred that the β-1,4-linked polysaccharide is a xyloglucan, particularly one derived from Tamarind seed gum; a glucomannan, particularly Konjac glucomannan; a galactomannan, particularly Locust Bean gum and Guar gum; a side chain branched galactomannan, particularly Xanthan gum; chitosan or a chitosan salt. Other β-1,4-linked polysaccharides such as mannan, are also preferred.

The natural polysaccharides can be modified with amines (primary, secondary, tertiary), amides, esters, ethers, urethanes, alcohols, carboxylic acids, tosylates, sulfonates, sulfates, nitrates, phosphates and mixtures thereof. Such a modification can take place in position 2, 3 and/or 6 of the saccharide unit. Such modified or derivatised polysaccharides can be included in the compositions of the present invention in addition to the natural polysaccharides.

Nonlimiting examples of such modified polysaccharides include: carboxyl and hydroxymethyl substitutions (e.g. glucuronic acid instead of glucose); amino polysaccharides (amine substitution, e.g. glucosamine instead of glucose); $C_1$-$C_6$ alkylated polysaccharides; acetylated polysaccharide ethers; polysaccharides having amino acid residues attached (small fragments of glycoprotein); polysaccharides containing silicone moieties. Suitable examples of such modified polysaccharides are commercially available from Carbomer and include, but are not limited to, amino alginates, such as hexanediamine alginate, biotin heparin, carboxymethylated dextran, guar polycarboxylic acid, carboxymethylated locust bean gum, carboxymethylated xanthan, chitosan phosphate, chitosan phosphate sulfate, diethylaminoethyl dextran, dodecylamide alginate, sialic acid, glucuronic acid, galacturonic acid, mannuronic acid, guluronic acid, N-acetylgluosamine, N-acetylgalactosamine, and mixtures thereof.

Especially preferred polysaccharides include xyloglucans and galactomannans, particularly Locust Bean gum.

It is preferred that the polysaccharide has a total number of sugar units from 10 to 7000, although this FIGURE will be dependent on the type of polysaccharide chosen, at least to some extent.

In the case of Locust Bean gum, the total number of sugar units is preferably from 50 to 7000. The preferred molecular weight is from 10 000 to 1000 000.

In the case of xyloglucan, the total number of sugar units is preferably from 1000 to 3000. The preferred molecular weight is from 250 000 to 600 000.

The polysaccharide can be linear, it can have an alternating repeat like in carrageenan, it can have an interrupted repeat like in pectin, it can be a block copolymer like in alginate, it can be branched like in dextran, or it can have a complex repeat like in xanthan. Descriptions of the polysaccharides are given in "An introduction to Polysaccharide Biotechnology", by M. Tombs and S. E. Harding, T.J. Press 1998.

In a particularly preferred embodiment the polysaccharides are water soluble.

Branched β-1,4 polysaccharides such as galactomannans, glucomannans or xyloglucans are water soluble or swell in water giving colloidal, highly viscous solutions or dispersions. The solubility properties of these materials depends on factors such as the frequency of branching sites and the length of the side chain.

It is especially preferred that the polysaccharide backbone is a xyloglucan or Locust Bean gum.

Structure of a Repeat Unit of Locust Bean Gum:

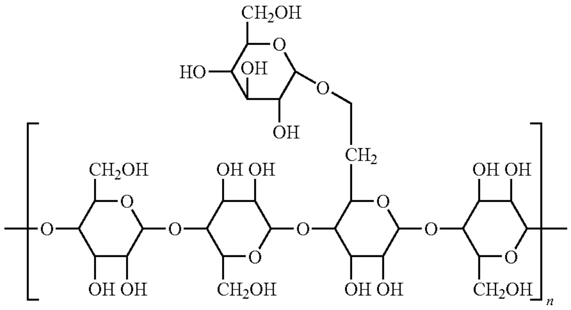

Locust bean gum is a copolymer with a backbone of (1,4)-linked β-D-mannose units having side stubs of (1,6)-linked α-D-galactose groups in a ratio of mannose to galactose=4:1

Structure of a Repeat Unit of Tamarind Seed Xyloglucan

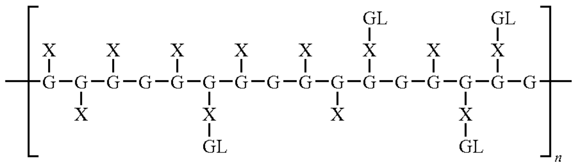

Xyloglucan is a copolymer with a β-D-glucose-(1,4)-β-D-glucose backbone containing β-D-galactose-(1,2)-α-D-xylose-(1,6)-β-D-glucose side chains.

If the solubility of the polysaccharide is high then it means that the polysaccharide can have a lower degree of substitution which in turn results in improved biodegradability.

This definition also includes other polysaccharides which have a similar solubility.

The Polymers

The polymers utilised in the invention are polysaccharides in which at least one sugar unit of the polysaccharide has been substituted by a group of the general formula $-L-R^1$ in which L and $R^1$ are as defined above.

Thus, preferred polymers have the general formula (I)

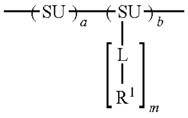

in which each SU represents a sugar unit in a polysaccharide backbone;

a represents the number of unsubstituted sugar units as a percentage of the total number of sugar units and is in the range from 0 to 99.9%, preferably 65 to 99%;

b represents the number of substituted sugar units as a percentage of the total number of sugar units and is in the range from 0.1 to 100%, preferably 1 to 35%;

m represents the degree of substitution per sugar unit and is from 0.005 to 1;

L represents an ester, amide or ether linkage; and $R^1$ represents an anionic alkyl group or a salt thereof.

Preferably, L represents a group —O—CO— or —O—.

It is also preferred that $R^1$ represents a substituted alkyl group, preferably a sulphoalkyl or a carboxyalkyl group, or a salt thereof. Preferably, the alkyl group is a $C_{1-6}$ alkyl, more preferably a $C_{1-4}$ alkyl, group. It is preferred that $R^1$ is an alkyl group substituted by a group of formula $—SO_3—R^2$ or $—CO—OR^3$ where $R^2$ and $R^3$ each independently represent a hydrogen atom or an alkali metal, preferably a sodium or potassium, atom. More preferably, $R^1$ represents a sulpho $C_{2-4}$ alkyl, preferably a sulphoethyl or sulphopropyl, group or a carboxy $C_{1-6}$ alkyl, preferably a carboxy $C_{1-4}$ alkyl and especially a carboxymethyl, group or a sodium salt thereof. In particularly preferred embodiments, $-L-R^1$ represents a group selected from $—O—CH_2CH_2SO_3H$, $—O—CH_2CH_2CH_2SO_3H$, $—O—CH_2—CO_2H$ and $—O—CO—CH_2CH_2CO_2H$ and sodium salts thereof.

$R^1$ may also represent a cyano or a phosphonate derivative, that is, a cyanoalkyl or phosphonatoalkyl group.

In particularly preferred embodiments, $-L-R^1$ represents the group $—O—CH_2CH_2SO_3H$ or $—O—CH_2—CO_2H$ or a sodium salt thereof.

It will be appreciated that the group $L-R^1$ is a relatively small substituent of a relatively small molecular weight compared to many of the groups which have been used as substituents for polysaccharides in the prior art.

According to a preferred embodiment of the invention there is provided the use of a compound, wherein the degree of substitution is from 0.005 to 0.5, preferably from 0.01 to 0.4.

This has the added advantage that these compounds have better biodegradability as a result of their lower degree of substitution.

Compounds useful in the present invention typically have a degree of biodegradation of at least 60% in 28 days when measured according to the test protocol set out in Example 4 below (test reference no. OECD 301B).

It is preferred that the polysaccharide backbone in the polymers is β-linked, preferably β-1,4-linked.

Preferably, the polysaccharide backbone is selected from the group consisting of xyloglucans (preferably those derived from Tamarind seed gum), glucomannans (preferably Konjac glucomannan), galactomannans (preferably Locust Bean gum, Guar gum and Xanthan gum), chitosan and chitosan salts. It is especially preferred that the polysaccharide backbone is a xyloglucan or Locust Bean gum.

In one preferred embodiment, the polymers have the general formula:

(II)

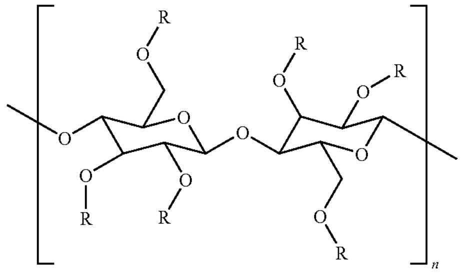

wherein at least one or more —OR groups of the polymer are independently replaced by a group $$-L-R^1$$

in which L and $R^1$ are as defined above and at least one or more R groups are independently selected from hydrogen atoms and groups of formulae: —

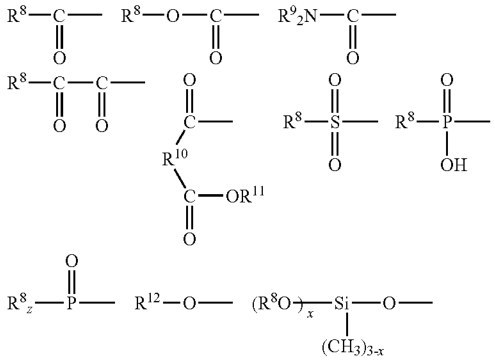

-continued

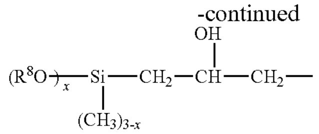

wherein each $R^8$ is independently selected from $C_{1-20}$ (preferably $C_{1-6}$) alkyl, $C_{2-20}$ (preferably $C_{2-6}$) alkenyl (e.g. vinyl) and $C_{5-7}$ aryl (e.g. phenyl) any of which is optionally substituted by one or more substituents independently selected from $C_{1-4}$ alkyl, $C_{1-12}$ (preferably $C_{1-4}$) alkoxy, hydroxyl, vinyl and phenyl groups;

each $R^9$ is independently selected from hydrogen and groups $R^8$ as hereinbefore defined;

$R^{10}$ is a bond or is selected from $C_{1-4}$ alkylene, $C_{2-4}$ alkenylene and $C_{5-7}$ arylene (e.g. phenylene) groups, the carbon atoms in any of these being optionally substituted by one or more substituents independently selected from $C_{1-12}$ (preferably $C_{1-4}$) alkoxy, vinyl, hydroxyl, halo and amine groups;

each $R^{11}$ is independently selected from hydrogen, counter cations such as alkali metal (preferably Na) or ½ Ca or ½ Mg, and groups $R^8$ as hereinbefore defined;

$R^{12}$ is selected from $C_{1-20}$ (preferably $C_{1-6}$) alkyl, $C_{2-20}$ (preferably $C_{2-6}$) alkenyl (e.g. vinyl) and $C_{5-7}$ aryl (e.g. phenyl), any of which is optionally substituted by one or more substituents independently selected from $C_{1-4}$ alkyl, $C_{1-12}$ (preferably $C_{1-4}$) alkoxy, hydroxyl, carboxyl, cyano, sulfonato, vinyl and phenyl groups;

x is from 1 to 3; and groups R which together with the oxygen atom forming the linkage to the respective saccharide ring forms an ester or hemi-ester group of a tricarboxylic- or higher polycarboxylic- or other complex acid such as citric acid, an amino acid, a synthetic amino acid analogue or a protein;

any remaining R groups being selected from hydrogen and ether substituents.

It is particularly preferred that $R^{12}$ is a methyl, ethyl, phenyl, hydroxyethyl, hydroxypropyl, carboxymethyl, sulphoethyl or cyanoethyl group.

For the avoidance of doubt, as already mentioned, in formula (II), some of the R groups may optionally have one or more structures, for example as hereinbefore described. For example, one or more R groups may simply be hydrogen or an alkyl group.

Preferred groups may for example be independently selected from one or more of acetate, propanoate, trifluoroacetate, 2-(2-hydroxy-1-oxopropoxy) propanoate, lactate, glycolate, pyruvate, crotonate, isovalerate cinnamate, formate, salicylate, carbamate, methylcarbamate, benzoate, gluconate, methanesulphonate, toluene, sulphonate, groups and hemiester groups of fumaric, malonic, itaconic, oxalic, maleic, succinic, tartaric, aspartic, glutamic, and malic acids.

Particularly preferred such groups are the monoacetate, hemisuccinate, and 2-(2-hydroxy-1-oxopropoxy)propanoate. The term "monoacetate" is used herein to denote those acetates with a degree of substitution of about 1 or less on a β-1,4 polysaccharide backbone.

Synthesis of the Polymers

The polymers used in the present invention may be synthesised by a variety of routes which are well known to those skilled in the art of polymer chemistry. For instance, sulphoalkyl ether-linked polymers can be made by reacting a polysaccharide with a suitable alkenyl sulphonic acid in a Michael addition reaction or by reacting a polysaccharide with a suitable chloro alkyl sulphonate.

Compositions

The substituted polysaccharide according to the first aspect of the present invention may be incorporated into compositions containing only a diluent (which may comprise solid and/or liquid) and/or also comprising an active ingredient. The compound is typically included in said compositions at levels of from 0.01% to 50%, particularly from 0.01% to 25% by weight, preferably from 0.05% to 15%, more preferably from 0.1% to 10%, especially from 0.1% to 5% and most preferably from 0.2% to 1.5%.

The active ingredient in the compositions is preferably a surface active agent or a fabric conditioning agent. More than one active ingredient may be included. For some applications a mixture of active ingredients may be used.

The compositions of the invention may be in any physical form e.g. a solid such as a powder or granules, a tablet, a solid bar, a paste, gel or liquid, especially, an aqueous based liquid. In particular the compositions may be used in laundry compositions, especially in liquid, powder or tablet laundry composition.

The compositions of the present invention are preferably laundry compositions, especially main wash (fabric washing) compositions or rinse-added softening compositions. The main wash compositions may include a fabric softening agent and rinse-added fabric softening compositions may include surface-active compounds, particularly non-ionic surface-active compounds, if appropriate.

The Organic Detergent Surfactant

The detergent compositions of the invention may contain a surface-active compound (surfactant) which may be chosen from soap and non-soap anionic, cationic, non-ionic, amphoteric and zwitterionic surface-active compounds and mixtures thereof. Many suitable surface-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and non-ionic compounds. The total amount of surfactant present is suitably within the range of 5 to 60 wt %, preferably from 5 to 40 wt %.

The compositions of the invention may contain anionic surfactants. Examples include alkylbenzene sulphonates, such as linear alkylbenzene sulphonate, particularly linear alkylbenzene sulphonates having an alkyl chain length of $C_8$-$C_{15}$. It is preferred that the level of linear alkylbenzene sulphonate is from 0 wt % to 30 wt %, more preferably 1 wt % to 25 wt %, most preferably from 2 wt % to 15 wt %.

The compositions of the invention may contain other anionic surfactants in amounts additional to the percentages quoted above. Suitable anionic surfactants are well-known to those skilled in the art. Examples include primary and secondary alkyl sulphates, particularly $C_8$-$C_{20}$ primary alkyl sulphates; alkyl ether sulphates; olefin sulphonates; alkyl xylene sulphonates; dialkyl sulphosuccinates; and fatty acid ester sulphonates. Sodium salts are generally preferred.

The compositions of the invention may also contain nonionic surfactant. Nonionic surfactants that may be used include the primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

It is preferred that the level of non-ionic surfactant is from 0 wt % to 30 wt %, preferably from 1 wt % to 25 wt %, most preferably from 2 wt % to 15 wt %.

It is also possible to include certain mono-alkyl cationic surfactants which can be used in main-wash compositions for fabrics. Cationic surfactants that may be used include quaternary ammonium salts of the general formula $R_1R_2R_3R_4N^+X^-$ wherein the R groups are long or short hydrocarbon chains, typically alkyl, hydroxyalkyl or ethoxylated alkyl groups, and X is a counter-ion (for example, compounds in which $R_1$ is a $C_8$-$C_{22}$ alkyl group, preferably a $C_8$-$C_{10}$ or $C_{12}$-$C_{14}$ alkyl group, $R_2$ is a methyl group, and $R_3$ and $R_4$, which may be the same or different, are methyl or hydroxyethyl groups); and cationic esters (for example, choline esters).

Amphoteric and zwitterionic surfactants that may be used include alkyl amine oxides, betaines and sulphobetaines. In accordance with the present invention, the detergent surfactant (a) most preferably comprises an anionic sulphonate or sulphonate surfactant optionally in admixture with one or more cosurfactants selected from ethoxylated nonionic surfactants, non-ethoxylated nonionic surfactants, ethoxylated sulphate anionic surfactants, cationic surfactants, amine oxides, alkanolamides and combinations thereof.

The choice of surface-active compound (surfactant), and the amount present, will depend on the intended use of the detergent composition. In fabric washing compositions, different surfactant systems may be chosen, as is well known to the skilled formulator, for handwashing products and for products intended for use in different types of washing machine.

The total amount of surfactant present will also depend on the intended end use and may be as high as 60 wt %, for example, in a composition for washing fabrics by hand. In compositions for machine washing of fabrics, an amount of from 5 to 40 wt % is generally appropriate. Typically the compositions will comprise at least 2 wt % surfactant e.g. 2-60%, preferably 15-40% most preferably 25-35%.

Detergent compositions suitable for use in most automatic fabric washing machines generally contain anionic non-soap surfactant, or non-ionic surfactant, or combinations of the two in any suitable ratio, optionally together with soap.

Any conventional fabric conditioning agent may be used in the compositions of the present invention. The conditioning agents may be cationic or non-ionic. If the fabric conditioning compound is to be employed in a main wash detergent composition the compound will typically be non-ionic. For use in the rinse phase, typically they will be cationic. They may for example be used in amounts from 0.5% to 35%, preferably from 1% to 30% more preferably from 3% to 25% by weight of the composition.

Preferably the fabric conditioning agent(s) have two long chain alkyl or alkenyl chains each having an average chain length greater than or equal to $C_{16}$. Most preferably at least 50% of the long chain alkyl or alkenyl groups have a chain length of $C_{18}$ or above. It is preferred that the long chain alkyl or alkenyl groups of the fabric conditioning agents are predominantly linear.

The fabric conditioning agents are preferably compounds that provide excellent softening, and are characterised by a chain melting $L\beta$ to $L\alpha$ transition temperature greater than 25° C., preferably greater than 35° C., most preferably greater than 45° C. This $L\beta$ to $L\alpha$ transition can be measured by DSC as defined in "Handbook of Lipid Bilayers, D Marsh, CRC Press, Boca Raton, Fla., 1990 (pages 137 and 337).

Substantially insoluble fabric conditioning compounds in the context of this invention are defined as fabric conditioning compounds having a solubility less than $1\times10^{-3}$ wt % in deminerailised water at 20° C. Preferably the fabric softening compounds have a solubility less than $1\times10^{-4}$ wt %, most preferably less than $1\times10^{-8}$ to $1\times10^{-6}$. Preferred cationic fabric softening agents comprise a substantially water insoluble quaternary ammonium material comprising a single alkyl or alkenyl long chain having an average chain length greater than or equal to $C_{20}$ or, more preferably, a compound comprising a polar head group and two alkyl or alkenyl chains having an average chain length greater than or equal to $C_{14}$.

Preferably, the cationic fabric softening agent is a quaternary ammonium material or a quaternary ammonium material containing at least one ester group. The quaternary ammonium compounds containing at least one ester group are referred to herein as ester-linked quaternary ammonium compounds.

As used in the context of the quarternary ammonium cationic fabric softening agents, the term 'ester group', includes an ester group which is a linking group in the molecule. It is preferred for the ester-linked quaternary ammonium compounds to contain two or more ester groups. In both monoester and the diester quaternary ammonium compounds it is preferred if the ester group(s) is a linking group between the nitrogen atom and an alkyl group. The ester groups(s) are preferably attached to the nitrogen atom via another hydrocarbyl group.

Also preferred are quaternary ammonium compounds containing at least one ester group, preferably two, wherein at least one higher molecular weight group containing at least one ester group and two or three lower molecular weight groups are linked to a common nitrogen atom to produce a cation and wherein the electrically balancing anion is a halide, acetate or lower alkosulphate ion, such as chloride or methosulphate. The higher molecular weight substituent on the nitrogen is preferably a higher alkyl group, containing 12 to 28, preferably 12 to 22, e.g. 12 to 20 carbon atoms, such as coco-alkyl, tallowalkyl, hydrogenated tallowalkyl or substituted higher alkyl, and the lower molecular weight substituents are preferably lower alkyl of 1 to 4 carbon atoms, such as methyl or ethyl, or substituted lower alkyl. One or more of the said lower molecular weight substituents may include an aryl moiety or may be replaced by an aryl, such as benzyl, phenyl or other suitable substituents.

Preferably the quaternary ammonium material is a compound having two $C_{12}$-$C_{22}$ alkyl or alkenyl groups connected to a quaternary ammonium head group via at least one ester link, preferably two ester links or a compound comprising a single long chain with an average chain length equal to or greater than $C_{20}$.

More preferably, the quaternary ammonium material comprises a compound having two long chain alkyl or alkenyl chains with an average chain length equal to or greater than $C_{14}$. Even more preferably each chain has an average chain length equal to or greater than $C_{16}$. Most preferably at least 50% of each long chain alkyl or alkenyl group has a chain length of $C_{18}$. It is preferred if the long chain alkyl or alkenyl groups are predominantly linear.

The most preferred type of ester-linked quaternary ammonium material that can be used in laundry rinse compositions according to the invention is represented by the formula (A):

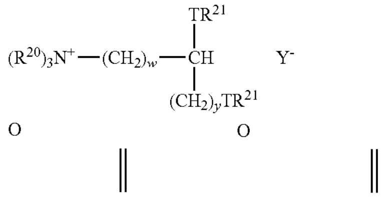

wherein T is —O—C— or —C—O—; each $R^{20}$ group is independently selected from $C_{1-4}$ alkyl, hydroxyalkyl or $C_{2-4}$ alkenyl groups; and wherein each $R^{21}$ group is independently selected from $C_8$-$C_{28}$ alkyl or alkenyl groups; $Y^-$ is any suitable counter-ion, i.e. a halide, acetate or lower alkosulphate ion, such as chloride or methosulphate;

w is an integer from 1-5 or is 0; and y is an integer from 1-5.

It is especially preferred that each $R^{20}$ group is methyl and w is 1 or 2.

It is advantageous for environmental reasons if the quaternary ammonium material is biologically degradable.

Preferred materials of this class such as 1,2 bis[hardened tallowoyloxy]-3-trimethylammonium propane chloride and their method of preparation are, for example, described in U.S. Pat. No. 4,137,180. Preferably these materials comprise small amounts of the corresponding monoester as described in U.S. Pat. No. 4,137,180 for example 1-hardened tallowoyloxy-2-hydroxy-3-trimethylammonium propane chloride.

Another class of preferred ester-linked quaternary ammonium materials for use in laundry rinse compositions according to the invention can be represented by the formula:

(B)

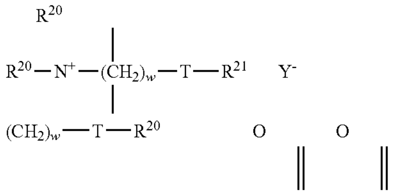

wherein T is —O—C— or —C—O—; and wherein $R^{20}$, $R^{21}$, w, and $Y^-$ are as defined above.

Of the compounds of formula (B), di-(tallowyloxyethyl)-dimethyl ammonium chloride, available from Hoechst, is the most preferred. Di-(hardened tallowyloxyethyl)dimethyl ammonium chloride, ex Hoechst and di-(tallowyloxyethyl)-methyl hydroxyethyl methosulphate are also preferred.

Another preferred class of quaternary ammonium cationic fabric softening agent is defined by formula (C): —

(C)

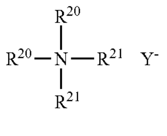

where $R^{20}$, $R^{21}$ and $Y^-$ are as hereinbefore defined.

A preferred material of formula (C) is di-hardened tallow-diethyl ammonium chloride, sold under the Trademark Arquad 2HT.

The optionally ester-linked quaternary ammonium material may contain optional additional components, as known in the art, in particular, low molecular weight solvents, for instance isopropanol and/or ethanol, and co-actives such as nonionic softeners, for example fatty acid or sorbitan esters.

The Detergency Builder

The compositions of the invention, when used as main wash fabric washing compositions, will generally also contain one or more detergency builder. The total amount of detergency builder in the compositions will typically range from 0 to 80 wt %, preferably from 0 to 60 wt %.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate are also suitable for use with this invention.

The compositions of the invention preferably contain an alkali metal, preferably sodium, aluminosilicate builder. Sodium aluminosilicates may generally be incorporated in amounts of from 5 to 60% by weight (anhydrous basis), preferably from 10 to 50 wt %, especially from 25 to 50 wt %.

The alkali metal aluminosilicate may be either crystalline or amorphous or mixtures thereof, having the general formula: 0.8-1.5 $Na_2O.Al_2O_3$.0.8-6 $SiO_2$ These materials contain some bound water and are required to have a calcium ion exchange capacity of at least 50 mg CaO/g. The preferred sodium aluminosilicates contain 1.5-3.5 $SiO_2$ units (in the formula above). Both the amorphous and the crystalline materials can be prepared readily by reaction between sodium silicate and sodium aluminate, as amply described in the literature. Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof.

The zeolite may be the commercially available zeolite 4A now widely used in laundry detergent powders. In an alternative embodiment of the invention, the zeolite builder incorporated in the compositions of the invention is maximum aluminium zeolite P (zeolite MAP) as described and claimed in EP 384 070A (Unilever). Zeolite MAP is defined as an alkali metal aluminosilicate of the zeolite P type having a silicon to aluminium ratio not exceeding 1.33, preferably within the range of from 0.90 to 1.33, and more preferably within the range of from 0.90 to 1.20.

In the case of zeolite MAP, zeolite MAP having a silicon to aluminium ratio not exceeding 1.07, more preferably about 1.00, is preferred. The calcium binding capacity of zeolite MAP is generally at least 150 mg CaO per g of anhydrous material.

The zeolites may be supplemented by other inorganic builders, for example, amorphous aluminosilicates, or layered silicates such as SKS-6 ex Clariant.

The zeolite may be supplemented by organic builders. Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di and trisuccinates, carboxymethyloxy succinates, carboxymethyloxymalonates, dipicolinates, hydroxyethyliminodiacetates, alkyl- and alkenylmalonates and succinates; and sulphonated fatty acid salts. This list is not intended to be exhaustive.

Especially preferred organic builders are citrates, suitably used in amounts of from 1 to 30 wt %, preferably from 5 to 30 wt %, more preferably from 10 to 25 wt %; and acrylic polymers, more especially acrylic/maleic copolymers, suitably used in amounts of from 0.5 to 15 wt %, preferably from 1 to 10 wt %.

Builders, both inorganic and organic, are preferably present in alkali metal salt, especially sodium salt, form.

Builders are suitably present in total amounts of from 10 to 80 wt %, more preferably from 20 to 60 wt %. Builders may be inorganic or organic.

A built composition in accordance with the invention may most preferably comprise from 10 to 80 wt % of a detergency builder (b) selected from zeolites, phosphates, and citrates.

Other Detergent Ingredients

The laundry detergent composition will generally comprise other detergent ingredients well known in the art. These may suitably be selected from bleach ingredients, enzymes, sodium carbonate, sodium silicate, sodium sulphate, foam controllers, foam boosters, perfumes, fabric conditioners, soil release polymers, dye transfer inhibitors, photobleaches, fluorescers and coloured speckles.

Compositions according to the invention may also suitably contain a bleach system. Fabric washing compositions may desirably contain peroxy bleach compounds, for example, inorganic persalts or organic peroxyacids, capable of yielding hydrogen peroxide in aqueous solution.

Suitable peroxy bleach compounds include organic peroxides such as urea peroxide, and inorganic persalts such as the alkali metal perborates, percarbonates, perphosphates, persilicates and persulphates. Preferred inorganic persalts are sodium perborate monohydrate and tetrahydrate, and sodium percarbonate.

Especially preferred is sodium percarbonate having a protective coating against destabilisation by moisture. Sodium percarbonate having a protective coating comprising sodium metaborate and sodium silicate is disclosed in GB 2 123 044B (Kao).

The peroxy bleach compound is suitably present in an amount of from 0.1 to 35 wt %, preferably from 0.5 to 25 wt %. The peroxy bleach compound may be used in conjunction with a bleach activator (bleach precursor) to improve bleaching action at low wash temperatures. The bleach precursor is suitably present in an amount of from 0.1 to 8 wt %, preferably from 0.5 to 5 wt %.

Preferred bleach precursors are peroxycarboxylic acid precursors, more especially peracetic acid precursors and pernonanoic acid precursors. Especially preferred bleach precursors suitable for use in the present invention are N,N,N',N',-tetracetyl ethylenediamine (TAED) and sodium nonanoyloxybenzene sulphonate (SNOBS). The novel quaternary ammonium and phosphonium bleach precursors disclosed in U.S. Pat. No. 4,751,015 and U.S. Pat. No. 4,818,426 (Lever Brothers Company) and EP 402 971A (Unilever), and the cationic bleach precursors disclosed in EP 284 292A and EP 303 520A (Kao) are also of interest.

The bleach system can be either supplemented with or replaced by a peroxyacid. Examples of such peracids can be found in U.S. Pat. No. 4,686,063 and U.S. Pat. No. 5,397,501 (Unilever). A preferred example is the imido peroxycarboxylic class of peracids described in EP A 325 288, EP A 349 940, DE 382 3172 and EP 325 289. A particularly preferred example is phthalimido peroxy caproic acid (PAP). Such peracids are suitably present at 0.1-12%, preferably 0.5-10%.

A bleach stabiliser (transition metal sequestrant) may also be present. Suitable bleach stabilisers include ethylenediamine tetra-acetate (EDTA), diethylenetriamine pentaacetate (DTPA), the polyphosphonates such as Dequest (Trade Mark), ethylenediamine tetramethylene phosphonate (EDTMP) and diethylenetriamine pentamethylene phosphate (DETPMP) and non-phosphate stabilisers such as EDDS (ethylene diamine disuccinate). These bleach stabilisers are also useful for stain removal especially in products containing low levels of bleaching species or no bleaching species.

An especially preferred bleach system comprises a peroxy bleach compound (preferably sodium percarbonate optionally together with a bleach activator), and a transition metal bleach catalyst as described and claimed in EP 458 397A, EP 458 398A and EP 509 787A (Unilever).

The compositions according to the invention may also contain one or more enzyme(s).

Suitable enzymes include the proteases, amylases, cellulases, oxidases, peroxidases and lipases usable for incorporation in detergent compositions. Preferred proteolytic enzymes (proteases) are, catalytically active protein materials which degrade or alter protein types of stains when present as in fabric stains in a hydrolysis reaction. They may be of any suitable origin, such as vegetable, animal, bacterial or yeast origin.

Proteolytic enzymes or proteases of various qualities and origins and having activity in various pH ranges of from 4-12 are available and can be used in the instant invention.

Examples of suitable proteolytic enzymes are the subtilins which are obtained from particular strains of *B. Subtilis B. licheniformis*, such as the commercially available subtilisins Maxatase (Trade Mark), as supplied by Gist Brocades N.V., Delft, Holland, and Alcalase (Trade Mark), as supplied by Novo Industri A/S, Copenhagen, Denmark.

Particularly suitable is a protease obtained from a strain of *Bacillus* having maximum activity throughout the pH range of 8-12, being commercially available, e.g. from Novo Industri A/S under the registered trade-names Esperase (Trade Mark) and Savinase (Trade-Mark). The preparation of these and analogous enzymes is described in GB 1 243 785. Other commercial proteases are Kazusase (Trade Mark obtainable from Showa-Denko of Japan), Optimase (Trade Mark from Miles Kali-Chemie, Hannover, West Germany), and Superase (Trade Mark obtainable from Pfizer of U.S.A.).

Detergency enzymes are commonly employed in granular form in amounts of from about 0.1 to about 3.0 wt %. However, any suitable physical form of enzyme may be used.

The compositions of the invention may contain alkali metal, preferably sodium, carbonate, in order to increase detergency and ease processing. Sodium carbonate may suitably be present in amounts ranging from 1 to 60 wt %, preferably from 2 to 40 wt %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate copolymer, or sodium silicate. One preferred powder structurant is fatty acid soap, suitably present in an amount of from 1 to 5 wt %. The amount of sodium silicate may suitably range from 0.1 to 5 wt %.

Other materials that may be present in detergent compositions of the invention include sodium silicate; antiredeposition agents such as cellulosic polymers; soil release polymers; inorganic salts such as sodium sulphate; lather control agents or lather boosters as appropriate; proteolytic and lipolytic enzymes; dyes; coloured speckles; perfumes; foam controllers; fluorescers and decoupling polymers. This list is not intended to be exhaustive. However, many of these ingredients will be better delivered as benefit agent groups in materials according to the first aspect of the invention.

In a particularly preferred laundry cleaning composition, the composition comprises (a) from 5 to 60 wt % of an organic detergent surfactant selected from anionic, nonanionic, cationic, zwitterionic and amphoteric surfactants and combinations thereof, (b) from 0 to 80 wt % of a detergent builder, (c) from 0.1 to 10 wt % of the polymer, and (d) optionally other detergent ingredients to 100 wt %.

The detergent composition when diluted in the wash liquor (during a typical wash cycle) will typically give a pH of the wash liquor from 7 to 10.5 for a main wash detergent.

Preparation of Particulate Detergent Composition

Particulate detergent compositions are suitably prepared by spray-drying a slurry of compatible heat-insensitive ingredients, and then spraying on or post-dosing those ingredients unsuitable for processing via the slurry. The skilled detergent formulator will have no difficulty in deciding which ingredients should be included in the slurry and which should not.

Particulate detergent compositions of the invention preferably have a bulk density of at least 400 g/litre, more preferably at least 500 g/litre. Especially preferred compositions have bulk densities of at least 650 g/litre, more preferably at least 700 g/litre.

Such powders may be prepared either by post-tower densification of spray-dried powder, or by wholly non-tower methods such as dry mixing and granulation; in both cases a high-speed mixer/granulator may advantageously be used. Processes using high-speed mixer/granulators are disclosed, for example, in EP 340 013A, EP 367 339A, EP 390 251A and EP 420 317A (Unilever).

Liquid detergent compositions can be prepared by admixing the essential and optional ingredients thereof in any desired order to provide compositions containing components in the requisite concentrations. Liquid compositions according to the present invention can also be in compact form which means it will contain a lower level of water compared to a conventional liquid detergent.

The present invention will now be explained in more detail by reference to the following non-limiting examples: —

EXAMPLES

Example 1

Preparation of Sulfoethylated Locust Bean Gum ($L=-O-$; $R^1=-CH_2CH_2SO_3Na$)

5 parts of Locust Bean Gum (Meyprodyn 200, ex Rhodia) (5 g, 0.003086 mol) was thoroughly macerated with 24.6 parts of a 30% w/w aqueous sodium hydroxide solution. The crumbs of alkali Locust Bean Gum so formed were then suspended in 100 parts of 2-isopropanol. The slurry was agitated and heated to 70° C. for 1 hour. To this mixture was then added a solution of 2 parts solid vinyl sulphonic acid dissolved in 20 $cm^3$ of 2-isopropanol. Heating was continued for 3 hours at 70° C. The product was isolated by filtering from the reaction solution and then purified by thoroughly washing with 80% aqueous methanol, followed by washing with methanol. The product was further purified by dialysis in demineralised water using 6-8K cut-off tubing for 1 week. The polymer was then freeze-dried yielding 5.37 g of creamy coloured powder.

IR: 1079 $cm^{-1}$, 1155 $cm^{-1}$ (s, sulphonic acid salts).

$^1$H-NMR Spectroscopy

Standard qualitative and quantitative experiments were performed using a Bruker 500 MHz spectrometer. Prior to analysis, the sample was de-polymerised by acid hydrolysis using a solution of 20% DCl in $D_2O$ heated for 1.25 hour at 70° C. The $D_2O$ solution contained 3-(trimethylsilyl)propionic acid sodium salt (TSP) as the internal standard. Signals are quoted in parts per million (ppm) relative to TSP:

3.3 ppm (s, $CH_2SO_3Na$, 0.575H); 3.4-4.4 ppm (m, LBG ring Hs+2H for $\overline{\text{LBG-OCH}_2\text{CH}_2\text{SO}_3\text{Na}}$, 6.747 Hs); 4.6-5.6 ppm (m, anomeric H, $\overline{1H}$). These integration values correspond to an average Degree of Substitution of the sulphoethyl group of 0.28.

Example 2

Preparation of Carboxymethyl Locust Bean Gum Derivatives ($L=-O-$; $R^1=-CH_2CO_2Na$)

Locust Bean Gum (5 g, 30.84 mmol of anhydrosugar units) was dispersed in a mixture of demineralised water (12 ml) and propan-2-ol (30 ml) with vigorous stirring in a 2-necked 100 ml round bottom flask fitted with a mechanical stirrer. After heating the solution to 70° C., sodium hydroxide (0.625 g, 15.6 mmol) was added and the mixture stirred for 15 minutes at the reaction temperature. Sodium chloroacetate (1.8 g, 15 mmol) was then added as a solution in demineralised water (2 ml) and the reaction mixture vigorously stirred for 15 minutes at 70° C. The same protocol of adding both reagents was repeated three times and the reaction mixture stirred for 6 hours whilst maintaining the temperature at 70° C. The reaction mixture was then poured into methanol (200 ml) and the resultant white precipitate collected on a sinter funnel. The product was washed repeatedly with methanol to remove glycolic acid. The product was then re-dispersed into hot demineralised water, resulting in a highly viscous solution. This was freeze-dried resulting in 4.75 g of white material.

IR: 1598 $cm^{-1}$ (s, carboxylate ion)

$^1$H-NMR:

Prior to analysis the sample was de-polymerised by acid hydrolysis using a solution of 20% DCl in $D_2O$ heated for 1 hour at 80° C.: The $D_2O$ solution contained 0.05% 3-(trimethylsilyl)propionic acid, sodium salt (TSP) as the internal standard. Signals are quoted in parts per million (ppm) relative to TSP.

4-4.8 ppm (6H, sugar H); 4.94 ppm (0.32H, glycolate $CH_2$); 5.25-5.95 ppm (1H, anomeric H). This corresponds to a degree of substitution by glycolate ester groups of 0.15.

Example 3

Antiredeposition Benefits

Method of Measuring Redeposition

The method involved the use of a tergotometer and multiple washing in order to simulate the redeposition process that occurs with repeated washing either under difficult wash conditions or with low efficiency wash products.

Test formulations were used to wash pre-soiled "test cloths" together with clean fabrics (redeposition monitors) under standard conditions. The soiled fabrics were used to supply soil to the system and also to measure the cleaning efficiency of the formulations. The clean fabrics were used to "collect" soil from the liquor and were used to quantify the level of soil redeposition. After washing, the test cloths and redeposition monitors were dried and their reflectance measured. A new batch of test cloths was then washed together with the redeposition monitors from the original wash cycle and the process repeated to give information on the level of redeposition after two wash cycles. This process was then repeated for a third, fourth (etc) wash cycle:

Cycle 1: test cloths, clean antiredeposition monitors
Cycle 2: test cloths, antiredeposition monitors from Cycle 1
Cycle 3: test cloths, antiredeposition monitors from Cycle 2
Cycle 4: test cloths, antiredeposition monitors from Cycle 3 . . .
Cycle n: test cloths, antiredeposition monitors from Cycle n−1

This protocol allows both the detergency and the redeposition process to be followed as a function of cycle number. The reflectance value falls with successive cycles as more soil is present in the system: the smaller the reflectance decrease, the better the antiredeposition properties of the formulation.

Test Formulations

A stock solution was prepared, using water of 40 degrees French hardness, containing 2 g/l of the following notional formulation (equivalent to 1.77 g/l of the specified ingredients the rest comprising other detergent ingredients such as water, enzyme, fluorescer, perfume etc.)

| Ingredient | Weight % |
|---|---|
| Sodium linear alkylbenzene sulphonate LAS (100%) | 26.00 |
| Sodium tripolyphosphate | 24.02 |
| Sodium sulphate | 18.14 |
| Sodium carbonate | 10.85 |
| Sodium alkaline silicate (48%) as 100% by weight | 4.66 |
| Water | to 100 |

The following formulations were tested:

| Example | |
|---|---|
| Comparative Example A | Formulation as stock solution (i.e. no polymer) |
| Comparative Example B | Formulation as stock solution plus 1.5 wt % carageenan* |
| Comparative Example C | Formulation as stock solution plus 1.5 wt % of SCMC** |
| Example 3A | Formulation as stock solution plus 1.5 wt % of Locust Bean Gum 5 ethyl sulphonate with a degree of substitution of 0.2 |
| Example 3B | Formulation as stock solution plus 1.5 wt % of Locust Bean Gum 75 ethyl sulphonate with a degree of substitution of 0.01 |

*Carageenan is a sulphated β1, 3- substituted polysaccharide (non-absorbing to cotton)
**SCMC is a sodium carboxymethyl cellulose with a degree of substitution of 0.87.

Test compounds were prepared using a synthetic method analogous to that disclosed in Example 1 above.

Locust bean gum 5 ethyl sulphonate degree of substitution of 0.2 has one ethyl sulphonate per 5 sugars.

Locust bean gum 75 ethyl sulphonate with a degree of substitution of 0.01 has one ethyl sulphonate per 75 sugar rings.

Sodium carboxymethyl cellulose was selected as an appropriate comparative compound since it is an antiredeposition agent which is commonly utilised in laundry detergent compositions.

For each product tested a minimum of 3 replicate washes were carried out.

Test Cloths

The soiled test cloths (detergency monitors) were 7.5 cm×7.5 cm squares as follows:

| Fabric | Soil |
|---|---|
| Polyester - Cotton | Indian Ink and Olive Oil |
| Cotton | Kaolin and sebum |
| Polyester | Kaolin and sebum |
| Cotton | Carbon black and mineral oil |

Three soiled test cloths of each type were included in each replicate wash.

The clean test cloths (antiredeposition monitors) were 10 cm×10 cm squares of the following fabrics:

woven polyester-cotton (50:50)
woven cotton
polyester

Three clean test cloths of each type were included in each replicate wash.

Test Wash Procedure

The tergotometer pots containing the test formulations, soiled and clean test cloths at 25° C. were agitated at 90 rpm for 15 minutes. The fabric bundles were then removed from the pots and rinsed twice in water (40 degrees French hard). The fabrics were then dried in the dark for at least 12 hours.

The reflectance values of the redeposition monitors were measured (full spectrum with ultraviolet excluded) before and after the wash.

The procedure was repeated for 3 cycles and reflectance measured at the end of each cycle.

Redeposition Results

The following table shows mean reflectance values after 3 wash cycles:

| Example | Antiredeposition agent | Number of cloths measured | Mean Reflectance change R460 |
|---|---|---|---|
| A | None | 9 | −11.21 |
| B | Carageeenan | 9 | −10.96 |
| C | SCMC | 18 | −5.66 |
| 3A | Formulation as stock solution plus 1.5 wt % of the Locust Bean Gum 5 ethyl sulphonate with a degree of substitution of 0.2 | 9 | −6.42 |
| 3B | Formulation as stock solution plus 1.5 wt % of the Locust Bean Gum 75 ethyl sulphonate with a degree of substitution of 0.01 | 9 | −9.91 |

This example demonstrates that LBG-ethyl sulphonate with a low degree of substitution acts as an effective antiredeposition agent when compared to a carboxylated cellulose, namely sodium carboxy methyl cellulose, with a higher degree of substitution. The controls are the base with no polymer at all and carrageenan, which is non-absorbing to cotton. This benefit is achieved alongside the advantage of ready biodegradability as shown in Example 4 below.

Example 4

Biodegradation Data for Locust Bean Gum-Ethyl Sulphonate

The protocol which has been used for the evaluation of ultimate aerobic biodegradability in organic compounds in an aqueous medium is a method using the analysis of inorganic Carbon in sealed vessels (Carbon dioxide Headspace Test), with a control of sodium benzoate.

The method estimates the extent of ready and ultimate biodegradation of an organic substance under aerobic conditions. It is based on the measurement of carbon dioxide production and therefore provides unequivocal evidence of biodegradation.

Aerobic microorganisms utilising an organic substrate as a carbon and energy source convert the molecule into new cells, carbon dioxide and water. Further when the available substrate is exhausted some bacteria die and are subsequently metabolised by the surviving cells. By measuring the amount of carbon dioxide produced by dosed test vessels in excess of undosed controls and comparing this quantity with the theoretical yield, calculated from the substrate carbon content), a measure of the ultimate biodegradability of the test sample can be made.

The test compound was dissolved in a mineral salts medium containing an inoculum of microorganisms and with a low inorganic carbon content (typically less than 1 mg per litre). The medium is added to a series of sealed vessels which are sacrificed for analysis at intervals during the test. The analysis consists in determining the concentration of inorganic carbon in both the headspace (gaseous phase) and in the liquid phase using a suitable carbon analyser.

The test medium contained per litre of ultra pure water 1 ml of calcium chloride dihydrate (36.4 g dissolved in 1 litre of ultra pure water), 1 ml of magnesium sulphate heptahydrate (22.5 g dissolved in 1 litre of ultra pure water), 1 ml of ferric chloride hexahydrate (0.25 g and 0.4 g EDTA disodium salt dissolved in 1 litre of ultra pure water), and 10 ml of phosphate buffer so that the solution had a pH of 7.4. The test substance concentration in the final test medium was in the range 2 to 20 mg per litre carbon.

Measurements of the percentage biodegradation versus time were then made. Test substances showing a degree of biodegradation of at least 60% in 28 days are considered to pass this biodegradability test.

Further information about this test can be ascertained from Birch, R. R. and Fletcher, R. J. (1991), The application of Dissolved Inorganic Carbon Measurements to the study of Aerobic Biodegradability, Chemosphere, 23, 507-524 and its reference is OECD 301B.

Ready Biodegradability Test Data for Locust Bean Gum ethyl sulphonate with a degree of substitution of 0.2

| Day No | Locust Bean Gum-Ethyl sulphonate (percent biodegradation) | Sodium Benzoate (percent biodegradation) |
|---|---|---|
| 0 | 0 | 0 |
| 3 | 25.6 | 77.1 |
| 9 | 43.7 | 95.1 |
| 14 | 58.0 | 94.6 |
| 17 | 61.6 | 94.4 |
| 28 | 72.9 | 97.7 |

Locust bean gum ethyl sulphonate with a degree of substitution of 0.2 is readily biodegradable, that is it does not require bacterial adaptation. Sodium carboxy methyl cellulose biodegrades minimally with unadapted bacteria, that is, it degrades less easily than the Locust bean gum ethyl sulphonate, see Environmental Toxicology and Chemistry, 1996, 15(3), 27 and van Ginkel & Gayton, 1996 in which they only reported 25% biodegradation of SCMC in a ready biodegradability test (Closed Bottle) after 28 days.

Example 5

Biodegradation Data for Carboxymethyl Locust Bean Gum

The test of Example 4 was repeated using carboxymethyl Locust Bean Gum derivatives with varying degrees of substitution to give the following results: —

% Biodegradation of Carboxymethyl (Locust Bean Gum) Derivatives with Varying Degrees of Substitution in the Sealed Vessel Test

| Day no. | Carboxymethyl locust bean gum (DS 0.19) | Carboxymethyl locust bean gum (DS 0.34) | Sodium Benzoate Control |
|---|---|---|---|
| 0 | 0 | 0 | 0 |
| 4 | 39.52 | 26.88 | 77.80 |
| 7 | 42.57 | 19.02 | 77.96 |
| 11 | 64.71 | 41.18 | 84.24 |
| 14 | 72.09 | 45.2 | 83.71 |
| 18 | 90.49 | 63.71 | 86.73 |
| 21 | 79.12 | 52.47 | 87.33 |
| 25 | 87.88 | 70.69 | 87.42 |
| 28 | 94.48 | 69.61 | 88.01 |

This data demonstrates that carboxymethyl Locust Bean Gum derivatives with a degree of substitution of 0.19 or 0.34 are also readily biodegradable, that is, they do not require bacterial adaptation.

The invention claimed is:

1. A method for promoting antiredeposition during laundering of a textile fabric, the method comprising laundering the fabric with a composition comprising a compound which is a polymer having the general formula (I):

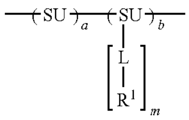

(I)

wherein:

each SU represents a sugar unit in a polysaccharide backbone;

L represents an ester, amide or ether linkage;

$R^1$ represents a sulphoethyl or sulphopropyl group or a sodium salt thereof;

a represents the number of unsubstituted sugar units as a percentage of the total number of sugar units and is from 0 to 99.9%;

b represents the number of substituted sugar units as a percentage of the total number or sugar units and is from 0.1 to 100%; and m represents the degree of substitution per sugar unit and is from 0.005 to 0.5;

wherein said compound has a degree of biodegradation of at least 60% in 28 days.

2. The method according to claim 1, in which L represents a group —O—CO— or —O—.

3. The method according to claim 1, in which the polysaccharide backbone is β-1,4-linked.

4. The method according to claim 1, in which the polysaccharide backbone is selected from the group consisting of xyloglucans, glucomannans, galactomannans, chitosan and chitosan salts.

5. The method according to claim 1, in which the polysaccharide backbone is a galactomannan.

6. The method according to claim 1, in which the polysaccharide backbone has a number average molecular weight from 5 000 to 10 000 000.

7. The method according to claim 1, in which the polymer is water soluble.

8. The method according to claim 1, in which m is from 0.01 to 0.4.

9. The method according to claim 5, in which the polysaccharide backbone is Locust Bean Gum.

10. The method according to claim 6, in which the polysaccharide backbone has a number average molecular weight from 50,000 to 1,000,000.

11. The method according to claim 10, in which the polysaccharide backbone has a number average molecular weight from 50,000 to 500,000.

12. The method according to claim 1, in which a is from 65 to 99%.

13. The method according to claim 1, in which b is from 1 to 35%.

14. The method according to claim 1, wherein:

L represents a group —O—CO— or —O—;

the polysaccharide backbone is Locust Bean Gum;

a is from 65 to 99%;

b is from 1 to 35%; and m is from 0.01 to 0.4.

* * * * *